UNITED STATES PATENT OFFICE.

JOHN M. BIERER, OF BOSTON, MASSACHUSETTS, ASSIGNOR TO BOSTON WOVEN HOSE & RUBBER CO., OF BOSTON, MASSACHUSETTS, A CORPORATION OF MASSACHUSETTS.

RUBBER COMPOSITION AND METHOD OF MAKING THE SAME.

1,303,759.   Specification of Letters Patent.   Patented May 13, 1919.

No Drawing.   Application filed September 1, 1916.   Serial No. 118,047.

*To all whom it may concern:*

Be it known that I, JOHN M. BIERER, a citizen of the United States, and a resident of Boston, in the county of Suffolk and State of Massachusetts, have invented an Improvement in Rubber Compositions and Methods of Making the Same, of which the following is a specification.

This invention relates to an improved composition of rubber and to the process of making the same, which composition is particularly applicable for use in the manufacture of outer soles for boots and shoes.

The invention has for its object to provide a superior rubber composition from which a superior rubber outer sole may be made, which is strong, light, tenacious, homogeneous, durable, inexpensive and capable of being finished like leather, whereby an outer sole made from such material can be used as a satisfactory substitute for a leather outer sole.

Prior to this invention I am aware that rubber outer soles have been made by the admixture of fibrous material in its natural state, such as cotton, jute, hemp and the like, with rubber or compounds of rubber and known to the trade as rubber, but such outer soles have been more or less unsatisfactory, and especially when cut at the edges to trim the sole, as the cut edges present a rough or fuzzy appearance due to the fibers of the fibrous filler employed, which fibers appear in the cut edge, and also as the soles when bent, crack or wrinkle. Furthermore such rubber soles cannot be provided with a smooth finished edge by means of a rotary knife now commonly used in trimming machines.

In accordance with the present invention, a rubber composition is produced, which is especially applicable for use in the manufacture of outer soles for boots and shoes, in that such outer sole may be made of a maximum thickness and minimum weight, of increased toughness and pliability, can be bent without cracking, and can be trimmed or cut with a rotary or other knife and have imparted to it a finished edge which is smooth and of the appearance of rubber itself, and free from fuzz and in which the fiber is not visible to the naked eye.

To this end, I admix with the rubber a fibrous material, such as cotton, jute, hemp and the like, which has been previously treated so as to change its physical structure and natural appearance and characteristics, and practically destroy its strength while retaining its bulk, and which by manipulation can easily be disintegrated and reduced to the form of a fine powder or dust, whereby the treated fibrous filler, when incorporated in the rubber and mixed therein, as now commonly practised in the manufacture of rubber compositions, will practically disappear from sight, yet will be present substantially in the form of a powder or dust and so thoroughly mixed with the rubber as to increase the toughness and stiffness of the latter without materially increasing its weight, and without impairing the pliability of the rubber, which can be folded or bent without cracking or wrinkling, and which can be trimmed on the rotary trimming machines now in use in factories and leave a finished edge, which is smooth and free from fuzz and has the appearance of an all rubber or a leather edge.

To facilitate description, I will hereinafter refer to the fibrous filler as cotton.

The cotton, preferably in the form of cotton waste, is treated by a fluid agent for a sufficient length of time to effect the physical change above described, and various fluid agents may be employed for this purpose, as for instance, chlorin gas, sulfuric acid, carbonic acid, and air and water in the presence of heat.

In such case the cotton is subjected to the action of the fluid agent until it has undergone the physical change desired, which may be determined by suitable tests, such as by inspection and pulling the fibers apart by the fingers.

When the desired change has taken place, which is indicated by the fibers being readily pulled apart or broken, the cotton is ready to be incorporated in the rubber, which is effected by machinery as now commonly practised.

The treatment of the cotton with chlorin gas may be effected by placing the cotton waste in a closed cylinder, producing a vacuum therein, then filling the cylinder with chlorin gas, and allowing the gas to act on the cotton for about four hours.

The treatment with sulfuric acid may be effected by immersing the cotton in a tank containing the acid and heating the contents by blowing steam therein.

The acid may be of different strengths and may vary from three to twenty per cent. according to the time required to effect the desired change, the time being shortened by increasing the strength of the acid, and may vary from twenty minutes to about five hours.

After the change in the cotton has been effected, the cotton is washed by decantation or otherwise and dried, whereupon it is in condition to be incorporated into the rubber.

The cotton may be treated with carbon dioxid ($CO_2$) by heating it to about 300° F. in a closed chamber in which the air has been replaced with the carbon dioxid, for a period of about twelve hours.

The cotton may also be treated by heating it in a vulcanizer or closed chamber with steam at about 100 lbs. per square inch pressure, for a period of about thirty hours.

This latter process is not regarded as desirable as the others, as the cotton is liable to be discolored, and on account of the length of time required.

The cotton treated by a fluid agent, such as above described, is very light, is free from fiber of any material strength, and is capable of being readily disintegrated, and consequently makes an excellent filler for rubber or its compounds, for a large quantity of the filler can be used to add bulk to the rubber without adding materially to the weight of the rubber. Also the treated cotton filler, being capable of being easily disintegrated, can be more intimately mixed with the rubber, whereby the toughness and stiffness of the latter is increased by a substance which is readily disintegrated and practically disappears, as the manipulation of the rubber can be carried on to such extent that the filler is not visible to the naked eye, and the filled rubber is capable of being cut by a rotary knife, so as to leave a smooth finished edge, which has the appearance of a cut edge of unfilled rubber, which is especially valuable in outer soles for boots and shoes for the reason that the outer sole not only can be finished with a rotary cutter but has a smooth finished edge free from any fuzzy or rough appearance and can be used as a most satisfactory substitute for leather, as it is capable of being finished like leather.

The lightness of the treated cotton enables the same to constitute a substantial percentage of the outer sole, thereby reducing the cost of the same, and by reason of its more intimate mixture with the rubber makes the same more homogeneous, stronger, more tenacious, and durable without impairing the flexibility or pliability of the rubber, and therefore a rubber outer sole of this material is capable of being bent without cracking or wrinkling, is of increased durability, is lighter, cheaper to produce, and can be sewed by machinery without tearing.

An outer sole such as above described may be considered a superior outer sole, which is especially adapted for use on the more expensive or high grade shoes, but it is not desired to limit the invention to the superior rubber or rubber outer sole herein described, as the treated cotton may be used with other fillers and increase in value the rubber product substantially in proportion to the amount of treated cotton used.

By the term "cotton" as used in the claims, I desire to be understood as including all fibrous material of like nature. So also by the term "rubber" as used in the claims, it is desired to include pure rubber and such compounds as are now found on the market under the name of rubber.

Claims:

1. The process of making a composition of rubber, which consists in subjecting cotton to the action of a fluid agent to change its physical characteristics and render it capable of being readily disintegrated by manipulation while retaining its fibrous appearance, mixing the cotton thus treated in a dry state with rubber, and manipulating the mixture of rubber and dried cotton to reduce the cotton to powdered form and thoroughly incorporate it with the rubber.

2. A rubber composition comprising a mixture of rubber and disintegrated cotton in powdered form and free or substantially free from the tensile strength possessed by untreated cotton.

3. A sole for boots and shoes composed of a mixture of rubber and disintegrated cotton in powdered form and free or substantially free from the tensile strength possessed by untreated cotton.

4. A rubber product comprising a mixture of rubber and chemically treated cotton in powdered form and free or substantially free from the tensile strength possessed by untreated cotton.

5. A sole for boots and shoes composed of a mixture of rubber and chemically treated cotton in powdered form and free or substantially free from the tensile strength possessed by untreated cotton.

In testimony whereof, I have signed my name to this specification.

JOHN M. BIERER.